J. J. AND G. E. ROYLE.
E. HARGRAVES, H. C. D. SCOTT AND G. L. RIDEHALGH, EXECUTORS OF J. J. ROYLE, DEC'D,
APPARATUS FOR RETURNING WATER OF CONDENSATION TO STEAM BOILERS.
APPLICATION FILED SEPT. 12, 1917.

1,333,735.

Patented Mar. 16, 1920.
6 SHEETS—SHEET 1.

Fig. 1.

Inventors:-
John James Royle
George Eric Royle
By their Attorney:- Walter Lunn

UNITED STATES PATENT OFFICE.

JOHN JAMES ROYLE AND GEORGE ERIC ROYLE, OF IRLAM, NEAR MANCHESTER, ENGLAND; EDWIN HARGRAVES, HARRY CHARLES DAVID SCOTT, AND GEORGE LEWIS RIDEHALGH, EXECUTORS OF SAID JOHN JAMES ROYLE, DECEASED, ASSIGNORS TO ROYLES LIMITED, OF IRLAM, ENGLAND, A FIRM.

APPARATUS FOR RETURNING WATER OF CONDENSATION TO STEAM-BOILERS.

1,333,735.      Specification of Letters Patent.      Patented Mar. 16, 1920.

Application filed September 12, 1917. Serial No. 190,950.

*To all whom it may concern:*

Be it known that we, JOHN JAMES ROYLE and GEORGE ERIC ROYLE, both subjects of the King of Great Britain and Ireland, and residents of Irlam, near Manchester, England, have invented Improvements in Apparatus for Returning Water of Condensation to Steam-Boilers and for like Purposes, of which the following is a specification.

This invention refers to new or improved apparatus for returning water of condensation to steam boilers and for like purposes, the said apparatus being of the kind comprising high and low level vessels, in the upper one of which are valves which are interconnected and, under the control of a float in the low level vessel, admit steam into the low level box and simultaneously close the passage for steam into the high level vessel, the said valves, under the control of a further float in the high level vessel, opening the passage for steam into the high level vessel and shutting off steam to the low level vessel when the water has been raised into the high level vessel.

Apparatus embodying this invention is characterized by a low level vessel provided with a steam inlet valve, controlled by a float inside such vessel, further, by the absence of a float or valves in the high level vessel, and by the connections between the vessels being such that the said intermediate valves are operated directly by the pressure in the low level vessel to shut off steam to the high level vessel and open an exhaust outlet, said intermediate valves opening the passage for steam to the high level vessel with a drop in pressure in the low level vessel. In this way the intermediate valves always operate after the steam valve of the low level vessel has completed its movements. Other features of the invention reside in the particular constructions and arrangements of parts whereby a very reliable apparatus is produced.

The improved apparatus may, in part, be used as a vacuum trap, and also as an ordinary return steam trap, or as a super-lifting trap.

The invention will now be described, in detail, with the aid of the accompanying drawings, wherein.

Figure 1:
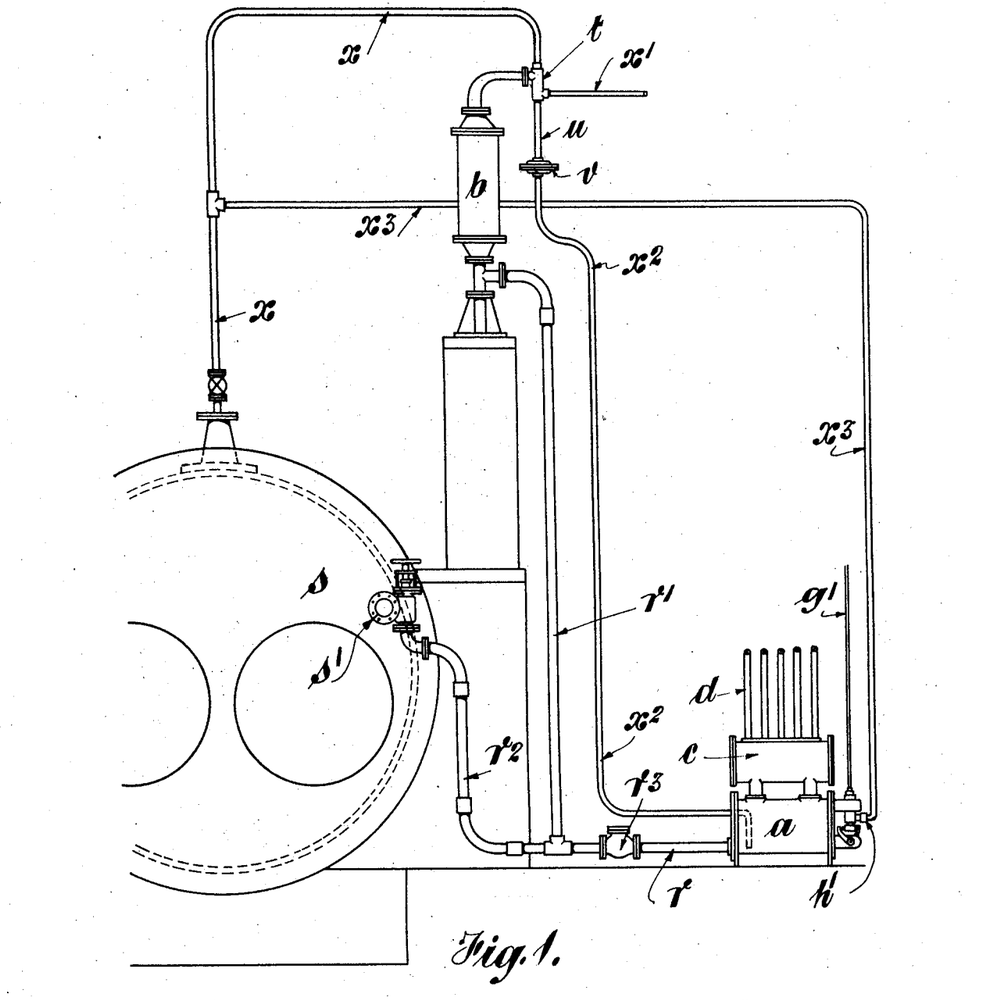
Figure 1 illustrates, in elevation, the general arrangement of parts forming the improved apparatus as adapted for returning water of condensation to a steam boiler against boiler pressure.
Figure 2:
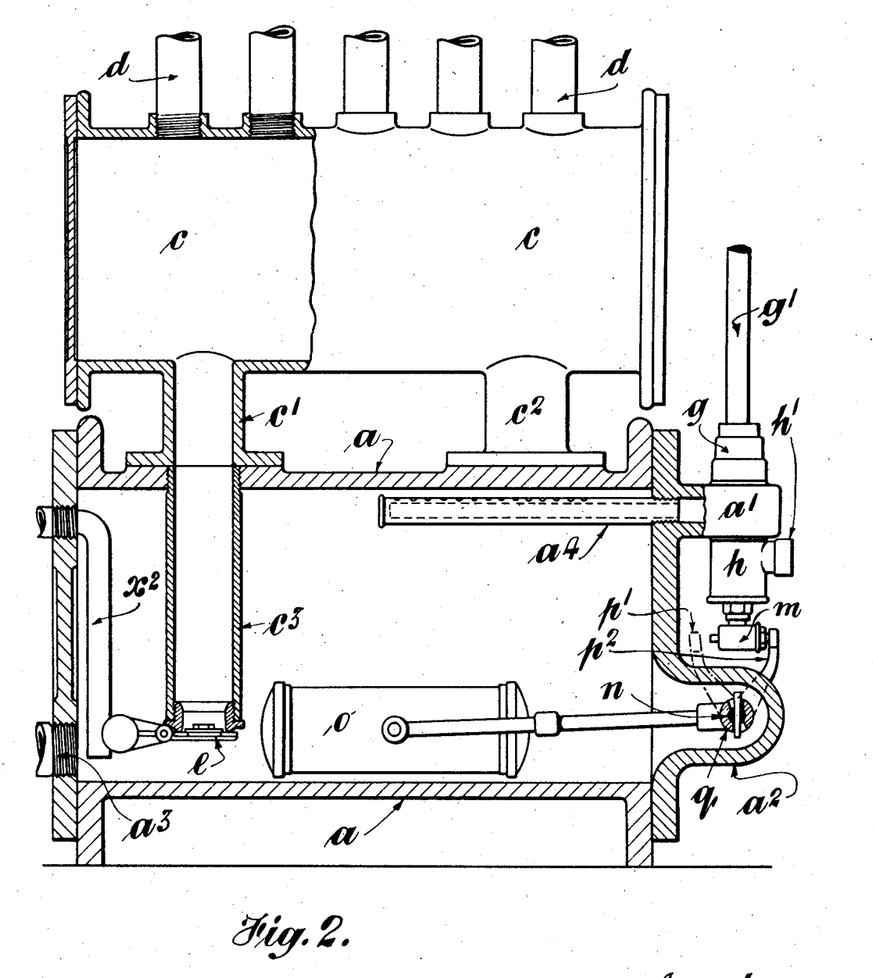
Fig. 2 illustrates, to a larger scale, a vertical section of the low level vessel, and of a drip chamber combined therewith.

Referring to Fig. 1, $a$ is the low level vessel, usually made of cast iron, and $b$ the high level vessel also usually made of cast iron or steel. As shown in Fig. 2, a drip chamber $c$ is mounted upon the vessel $a$, into which a series of drip pipes $d$ may deliver the water requiring to be fed to the boiler. The chamber $c$ is held to the vessel $a$ by a flanged pipe $c'$ and a flanged support $c^2$, and forming an extension of the pipe $c'$ is a pipe $c^3$, this latter extending down to a point near the bottom of the vessel $a$, where it is fitted with a hinged flap valve $e$ counterweighted to remain normally closed and only to open under the weight of water in the pipe $c^3$ and chamber $c$. To one end of the vessel $a$ is fitted the improved steam inlet and exhaust valve mechanism, the vessel being cast with a hollow protuberance $a'$ through which vertically extends the stem part $f$ of the valve casing $g$, see Fig. 3, and against the top and lower faces of which the larger parts $g$, $h$ respectively lie. The said stem part $f$ is formed with ports $f'$ at points opposite the interior of the protuberance $a'$ which communicates with the interior of the vessel $a$, see Fig. 2.

Figure 3:
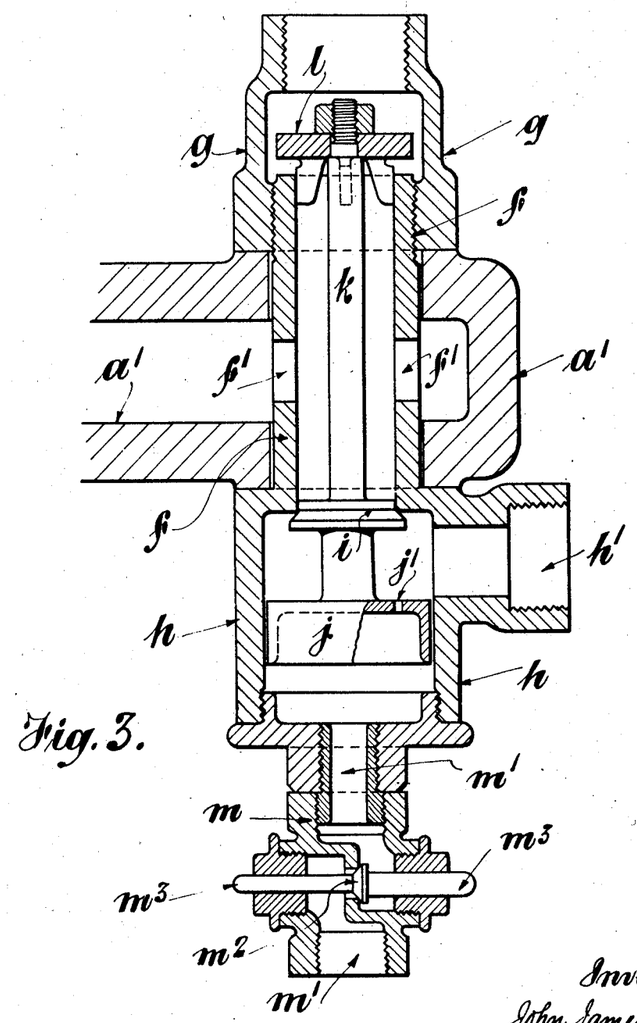
Fig. 3 illustrates a sectional elevation of the valve mechanism used with the low level vessel, the main inlet valve and an auxiliary valve being shown closed and the exhaust valve open.

Within the part $h$ is mounted the main steam inlet valve $i$ connected to or formed in one with a piston $j$, this latter being a slack fit and having formed in it a small hole $j'$. In one with or connected to the valve $i$ is a spindle $k$, which after extending upward through the stem part $f$ of the valve casing, is fitted with an exhaust valve $l$. The position of this exhaust valve relatively to the inlet valve $i$ is such that when the valve $i$ is closed the valve $l$ uncovers the upper end of the stem part $f$, while when the valve $i$ is fully open the valve $l$ closes the end of the stem part. In one with the part $h$ is a branch inlet $h'$ for the admission of live steam. The part $g$ is screw-threaded to receive an exhaust outlet pipe $g'$.

Figures 4, 5:
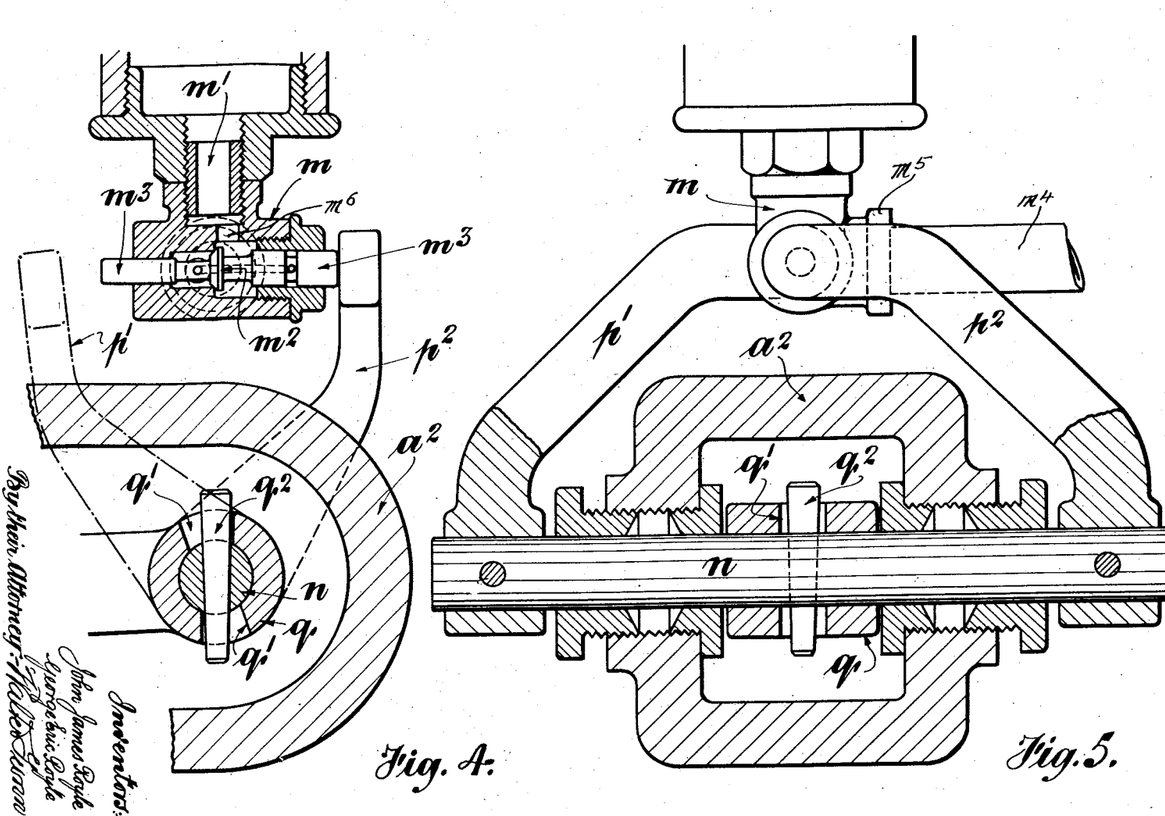
Fig. 4 illustrates a sectional elevation of the lower end of the valve fitting and part of the low level vessel, together with a side view of float-operated tappet levers used for operating the auxiliary valve.
Fig. 5 illustrates a front view, partly exterior and partly sectional, of the same parts shown in Fig. 4.

At its lower end and below the piston $j$, the valve fitting is provided with a small auxiliary valve $m$, the passage $m'$ through which leads from the space below the piston $j$ to the atmosphere. The valve proper $m^2$ is preferably arranged with its spindle $m^3$ at right angles to the longitudinal axis of the valve $i$, and the ends of the spindle extend outside the valve casing, as shown. The valve passage $m'$ may extend vertically downward as shown in Fig. 3, but it will preferably extend partly downward and partly sidewise, as shown in Figs. 4 and 5, in order to allow of the connection of an exhaust pipe $m^4$ to the outlet of the passage $m'$. For this purpose the valve body is formed with a lateral branch $m^5$, the bore of which opens into the valve chamber. The passage $m'$ opens into the main chamber through aperture $m^6$.

Within a further hollow protuberance $a^2$ on the end of the vessel $a$ is journaled the axis $n$ of a float $o$, see Figs. 2, 4 and 5. At each end, the axis $n$ extends beyond the sides of the protuberance $a^2$ and is there fitted with tappet levers $p'$, $p^2$. These levers are bent and overlie the protuberance $a^2$, see Fig. 5, and while the free end of one lever lies opposite one end of the spindle of the valve $m^2$, the free end of the other lever lies opposite the other end of the spindle of said valve. Further, the position of the levers on the axis $n$ is such that when one lever is touching the valve spindle, the other lies clear, see Fig. 4. The boss $q$ of the float rod is formed with segmental slots $q'$ and passing through the axis is a pin $q^2$, the ends of which extend through the slots and a space being left between the pin and one end of each slot, in order that the float in rising and falling shall have a considerable movement before acting upon the axis $n$ and the tappet levers. Of course, by lengthening the protuberances $a'$ and $a^2$, which will allow more room for the tappet $p'$ to work in, the boss $q$ may be rigidly fixed to the axis $n$.

At that end of the vessel $a$ farthest from the valve fitting is a discharge outlet $a^3$ connected by pipes $r$ and $r'$ to the vessel $b$, see Fig. 1. The pipe $r$ is also connected to the steam boiler $s$ via the pipe $r^2$ and the usual non-return boiler feed valve $s'$, the arrangement being such that while the pipe $r'$ forms, in conjunction with pipe $r$, the means of communication between the vessels $a$ and $b$, it also forms, in conjunction with the pipe $r^2$, the means of communication between the lower part of the vessel $b$ and the boiler. In the pipe $r$ is fitted a non-return valve $r^3$.

Figure 6:
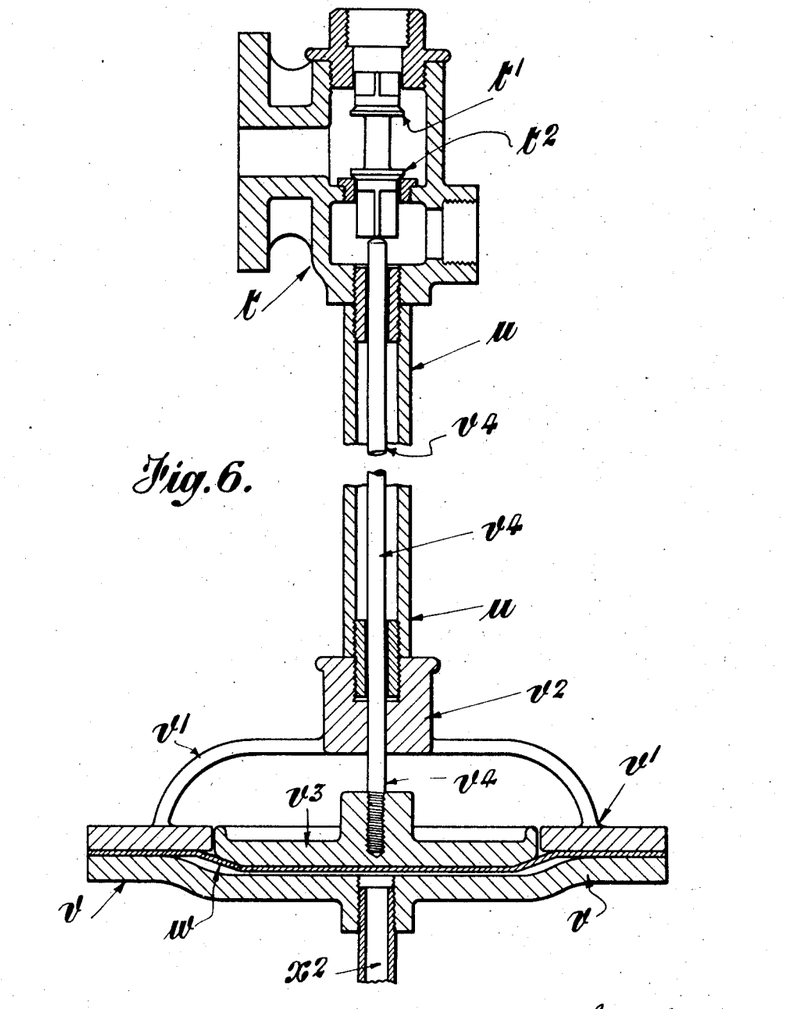
Fig. 6 illustrates, to a larger scale, a longitudinal sectional elevation of the valve mechanism used with the high level vessel.

In Fig. 6 is shown the steam inlet and exhaust outlet valve mechanism of the high level vessel $b$, such mechanism comprising a casing $t$ and the reversed valves $t'$, $t^2$, these latter being connected one to the other. While the valve $t'$ is adapted to control the passage of steam from the boiler into the top end of the vessel $b$, the valve $t^2$ is adapted to allow of the vessel $b$ being exhausted to atmosphere when the valve $t'$ is closed.

Depending from the lower part of the valve casing $t$ is a tube $u$, and connected to the lower end of the tube is a diaphragm fitting. This fitting comprises a lower dish-like part $v$ and an upper ring part $v'$ with raised grid-like center, the boss $v^2$ of which is connected to the tube $u$. Between the said parts $v$ and $v'$ is clamped, by bolts and nuts, the edge of a flexible diaphragm $w$. Resting centrally upon the diaphragm is a plate $v^3$, the shape of the underside of which, and that of the upper face of the part $v$, being such as to insure of there being as little of the diaphragm unsupported as possible. The plate $v^3$ is a loose sliding fit within the part $v'$. Connected at its lower end to such plate is a spindle $v^4$ which extends through the tube $u$ and at its upper end bears against the valve $t^2$, the length of the rod being such that with the diaphragm $w$ at rest the valve $t^2$ lies on its seating.

Connected with the upper part of the valve casing $t$ is a pipe $x$ leading to the steam space of the boiler, see Fig. 1, while connected to the lower part of the valve casing $t$ is a pipe $x'$ leading to atmosphere. Connected to the part $v$ and centrally below the diaphragm $w$ is a pipe $x^2$, which at its lower end is connected to the low level vessel $a$, see Fig. 1.

The action of the apparatus is as follows: Steam from the boiler being admitted into the valve casing via pipe $x^3$ and branch $h'$, it finds its way, through the hole $j'$, into the space below the piston, and thereupon places the piston in equilibrium, and closes the valve $i$, which simultaneously opens the exhaust valve $l$. Water of condensation, or any other water required for the proper feeding of the boiler, is then free to enter the vessel $a$ via the pipes $d$, chamber $c$, pipe $c^3$ and non-return valve $e$, the float $o$ rising with the rising water line. When the vessel $a$ is about two-thirds full the float $o$ acts upon the axis $n$ to rotate the same and cause the tappet lever $p'$ to press against the spindle $m^3$ of the valve $m^2$ and push the valve off its seating. The opening of this valve serves to exhaust to atmosphere, by way of the passage $m'$, the steam which has accumulated below the piston $j$. The underside of the piston being exhausted and the piston itself being of considerably larger area than the valves $i$ and $l$, the piston falls partly by gravity but mainly by the pressure of the steam admitted through the connection $h'$. In thus moving down, the piston pulls the valve $i$ off its seating, and thereby opens the way for the high pressure steam to enter the vessel $a$ by way of the ports $f'$. Simultaneously with the opening of the valve $i$ the valve $l$ is closed.

The first effect of the admission of the steam pressure to the low level vessel $a$ is that this pressure is transmitted by way of the pipe $x^2$ to the underside of the diaphragm $w$. The resulting upward movement of the diaphragm is communicated to the valves $t'$ and $t^2$ by means of the connecting rod $v^4$. This movement closes the valve $t'$, thereby isolating the upper vessel $b$ from the boiler steam space, and opens the valve $t^2$ which allows the vessel $b$, which up to now contains steam at the boiler pressure, to exhaust to atmosphere, or any type of condenser. The exhausting of the vessel $b$ now allows of the water in the low level vessel $a$ being forced up into the high level vessel $b$ by means of the steam pressure admitted to the vessel $a$ in the manner before described, by way of the pipe $r$, the non-return valve $r^3$ and the pipe $r'$.

The resulting fall of the float $o$ in the vessel $a$ rotates the axis $n$ in a contrary direction, thereby bringing the tappet $p^2$ into contact with the spindle $m^3$ and thus closing the valve $m^2$. The escape of steam pressure from the underside of the piston $j$ now being stopped, the two sides of the piston are rapidly put into equilibrium by the steam passing around the sides of the piston and through the bored hole $j'$. This causes the piston to be absolutely inactive and the valve $i$ is carried upward to its seat by the pressure of the steam.

The exhaust valve $l$ being connected to the steam valve $i$ by means of the rod $k$, the exhaust valve $l$ is opened by the closing of the steam inlet valve $i$, and the vessel $a$ is exhausted to atmosphere, or to a condenser, by way of the exhaust pipe $g'$.

The exhausting of the lower vessel $a$ immediately releases the pressure from the underside of the diaphragm $w$, which is forced down, together with the rod $v^4$ and the valves $t'$ and $t^2$, by the boiler steam pressure acting on the top of the valve $t'$ through the pipe $x$. The valve $t'$ is thus opened and boiler steam at the full boiler pressure is admitted into the top of the high level vessel $b$. This creates an equilibrium of pressure between the boiler and the vessel $b$ and the water in the vessel $b$ runs into the boiler by gravity by way of the pipes $r'$ and $r^2$.

The exhausting of the lower vessel $a$ permits the next charge to run in by the pipe $c^3$ from the collecting vessel $c$ where it has been accumulating.

It is desirable that the opening of the valve $i$ shall be comparatively small and that of the valve $l$ comparatively large. To allow of this the valve $i$ is formed with a piston part, and a conical part, as shown, the piston part only uncovering, or covering the passage for the steam when the exhaust valve is half open, or closed.

In shaping the part $v$ as shown, and by allowing the plate $v^3$ merely to rest upon the diaphragm, and making it almost equal to the full working diameter of the diaphragm, the diaphragm is relieved of most of the strain and wear due to repeated flexure, and by employing a grid-like top plate $v'$, the diaphragm is kept comparatively cool.

Obviously, the improved apparatus may be used for delivering feed water or make up water to the boiler, as well as for returning water of condensation to the boiler.

Figure 7:
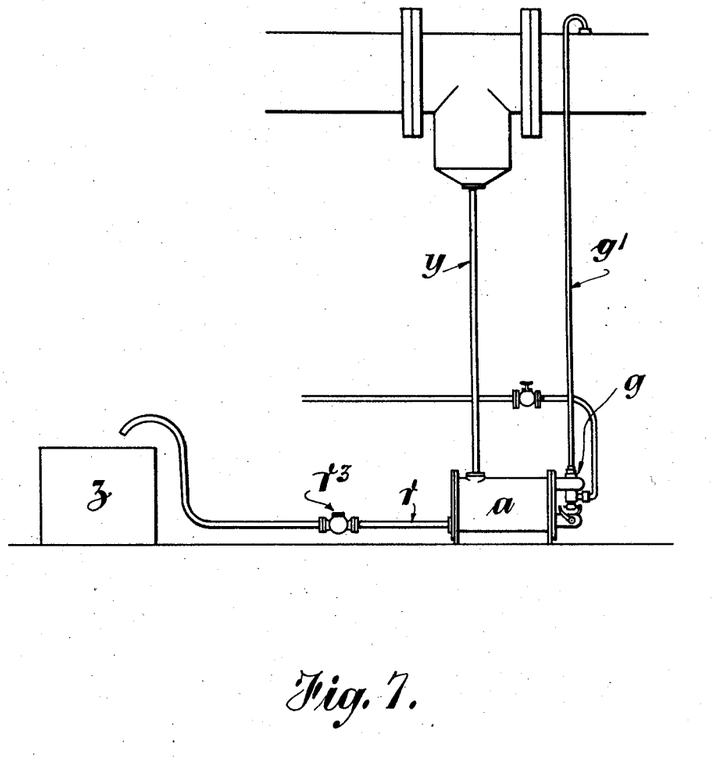
Fig. 7 illustrates the invention as adapted, in part, for use as a vacuum trap.

As shown in Fig. 7, the vessel $a$ and its valves may be employed as a vacuum trap for use with condensers, and other like apparatus, working under a vacuum. In this connection the drip chamber $c$ may be dispensed with and the vessel $a$ connected directly to the apparatus to be drained by pipe $y$. The exhaust pipe $g'$ of the valve fitting will be connected to the vacuum apparatus so that a vacuum will be maintained in the interior of the vessel after each discharge. The water will be discharged into a tank $z$ or other suitable receiver through the pipe $r$ and non-return valve $r^3$. The said low level vessel and its valve fittings may also be used as an ordinary return steam trap, $i. e.$, the vessel may be arranged above the level of the boiler and the water drained directly into the boiler when the steam at boiler pressure is admitted into the vessel $a$. The said vessel and its valve fitting may also be used as a superlifting steam trap, the water of condensation draining into the vessel from a low pressure source and being lifted to an overhead tank by high pressure steam. In these last named examples the pipe $g'$ will be open to the atmosphere.

To prevent the steam directly striking the float as it enters the vessel $a$, a perforated pipe $a^4$ may be provided, the perforations facing the top of the vessel, see Fig. 2.

It may here be noted that the valve $i$ lies between the piston $j$ and the exhaust valve $l$, an arrangement which allows of the valve casing $f$ being in one piece and easily constructed. Further, the movement of the valve $i$ away from the seating results in the valve *l* being pulled on to its seating, and vice versa. It may also be noted that the ports *f'* serve at one time to admit live steam to the vessel *a* and at another time to convey waste steam to the exhaust outlet. Further, by arranging the valves *i* and *m²* in one fitting and such fitting at the end of the casing *a*, the float tappet levers *p'*, *p²* are adapted to act directly upon the valve spindle *m³*. By arranging the valves *i* and *l* and the piston *j* vertically, they are assisted by gravity when the valve *i* requires to open.

A further feature to be noted is that the valves *i* and *l* are always either fully open or fully shut. The valve *m²* when pushed off its seating has a slight "pop" action i. e., it offers a slight resistance to the tappet lever and when such resistance is overcome moves quickly. Very positive action is thus insured both with the valves *i* and *l* and the valve *m²*, any tendency of the valves to stick or remain on a dead center, as in known apparatus for a like purpose, being entirely absent in this invention.

What we claim is:—

1. Boiler feed water apparatus comprising high and low level vessels, pipes connecting the vessels to each other and to the boiler, a steam inlet valve for the low level vessel, a float within the low level vessel for controlling said inlet valve, steam inlet and exhaust valves for the high level vessel, a valve casing inclosing said last-named valves, an open conduit connecting said casing with said low level vessel whereby the pressures obtaining in said low level vessel are communicated to said valve casing, and pressure-controlled means in said casing for controlling the valves of the high level vessel, whereby the admission and cutting off of steam to and from the low level vessel is directly controlled by said float and the admission and cutting off of steam to and from the high level vessel is indirectly controlled by said float through the latter's control of the steam inlet valve for the low level vessel.

2. Boiler feed water apparatus comprising high and low level vessels, the low level vessel having a quick-acting float-controlled steam inlet valve, diaphragm-controlled steam inlet and exhaust valves for the high level vessel, pipe connections fitted with check valves between the two vessels and the boiler, and a further pipe connection between the low level vessel and the underside of the diaphragm, whereby the admission and cutting off of the steam to and from the high level vessel is controlled by the valve in the low level vessel through the diaphragm-controlled valves, the latter operating after the valve of the low level vessel has completed its movements, substantially as herein set forth.

3. In combination, a vessel having water inlet and outlet pipes provided with non-return valves, valve mechanism for controlling the ingress and egress of steam into and out of the vessel, said mechanism comprising a valve casing, a steam inlet valve, an exhaust outlet valve, and a piston, the steam inlet valve being intermediate of the exhaust valve and piston, and the valves and piston being interconnected, said valve casing having a steam inlet branch intermediate of the steam inlet valve and the piston, an exhaust orifice at the end farthest from the piston, and steam ports intermediate of the inlet and exhaust valves leading to the interior of the said vessel, an auxiliary valve, the spindle of which extends outside the valve casing at both ends, and said valve being adapted to open and close a passage leading to the atmosphere on that side of the piston farthest from the steam inlet valve, said passage communicating with the steam inlet through a small hole, a float within the said vessel, and tappet levers adapted to be operated by the float, and, in turn, act upon the auxiliary valve spindle, as set forth.

4. In combination, a vessel having water inlet and outlet pipes provided with non-return valves, a valve fitting at one end of the vessel for controlling the ingress and egress of steam, said fitting comprising a vertically disposed casing, a steam inlet valve, an exhaust outlet valve and a piston, the inlet valve being arranged between the exhaust valve and the piston, and the valves and piston being interconnected, said valve casing having a steam inlet orifice intermediate of the steam inlet valve and piston, an exhaust outlet orifice at its upper end, and steam ports intermediate of the inlet and exhaust valves leading to the interior of the said vessel, an auxiliary valve integral with the said valve fitting, the spindle of the valve extending outside the valve casing at both ends, and said valve being adapted to open and close a passage leading to the atmosphere on that side of the piston farthest from the steam inlet valve, said passage communicating with the steam inlet through a small hole, a float within said vessel, an axis for said float journaled in one end of the vessel, and tappet levers on said axis with their free ends lying opposite the ends of the auxiliary valve spindle, and adapted with the rise and fall of the float beyond predetermined limits to press upon the valve spindle and open or close the auxiliary valve, as set forth.

5. In combination, two vessels, one arranged below the level of a steam boiler and the other above the level of such boiler, said low level vessel having a water inlet pipe provided with a non-return valve, and also having valve mechanism comprising a valve casing, inlet and exhaust valves, and a piston, the valves and piston being interconnected and the inlet valve being intermediate of the exhaust valve and piston, said mechanism also comprising an auxiliary valve which controls a passage leading to the atmosphere on that side of the piston farthest from the steam inlet valve, said passage communicating with the steam inlet through a small hole, a float within the low level vessel and float-operated tappet mechanism adapted with the rise and fall of the water in the low level vessel beyond predetermined limits to open or close the auxiliary valve, a discharge pipe having a non-return valve extending from the low level vessel to the high level vessel, a valve fitting, adjacent to the said upper vessel, comprising a valve casing and interconnected and reversed steam inlet and exhaust outlet valves within said casing, the latter at its top end communicating with the steam space of the boiler, at a point between the inlet and exhaust valves communicating with the upper end of the high level vessel, and at its lower end being formed with an exhaust outlet, said valve fitting also comprising a diaphragm chamber and diaphragm, a spindle between the diaphragm and the exhaust valve, a pipe leading from beneath the diaphragm to the low level vessel, and a further pipe having a non-return valve between the discharge pipe of the low level vessel and the boiler, as set forth.

6. In combination, two vessels, one arranged below the level of a steam boiler, and the other above the level of such boiler, said low level vessel having a water inlet pipe provided with a non-return valve, and also having valve mechanism comprising a valve casing, inlet and exhaust valves and a piston, the valves and piston being inter-connected and the inlet valve being intermediate of the exhaust valve and piston, said mechanism also comprising an auxiliary valve which controls a passage leading to the atmosphere on that side of the piston farthest from the steam inlet valve, said passage being in communication with the steam inlet through a small hole, a float within the low level vessel and float-operated tappet mechanism adapted with the rise and fall of the water in the low level vessel beyond predetermined limits to open or close the auxiliary valve, a discharge pipe having a non-return valve extending from the low level vessel to the high level vessel, a valve fitting, adjacent to the said upper vessel, comprising an outer casing and interconnected and reversed steam inlet and exhaust valves within said casing, this latter at its top end communicating with the steam space of the boiler, at a point between the inlet and exhaust valves communicating with the upper end of the high level vessel, and at its lower end formed with an exhaust outlet, said valve fitting also comprising a diaphragm chamber and diaphragm, the chamber being connected to the valve casing by a tube and said chamber comprising a lower dished part and a gridlike upper part, a loose plate resting upon the diaphragm and shaped on its underside to the lower part, a rod resting upon such plate at its lower end and extending at its other end to the underside of the exhaust valve of the valve fitting, a pipe leading from the underside of the diaphragm to the low level vessel, and a further pipe having a non-return valve between the discharge pipe of the low level vessel and the boiler, as set forth.

7. In combination, a vessel having water inlet and outlet pipes provided with non-return valves, valve mechanism for controlling the ingress and egress of steam into and out of the vessel, said mechanism comprising a valve casing, a steam inlet valve, an exhaust outlet valve and a piston, the steam inlet valve being intermediate of the exhaust valve and piston, and the valves and piston being interconnected, said valve casing having a steam inlet branch intermediate of the steam inlet valve and the piston, an exhaust orifice at the end farthest from the piston, and steam ports intermediate of the inlet and exhaust valves leading to the interior of the said vessel, an auxiliary valve, the spindle of which extends outside the valve casing at both ends, and said valve being adapted to open and close a passage leading to the atmosphere on that side of the piston farthest from the steam inlet valve, said passage communicating with the steam inlet through a small hole, a float and float rod within said vessel, an axis for said float rod journaled in one part of the vessel, the float rod boss having segmental slots and the axis having a pin, which extends through the slots, tappet levers on the axis, with their free ends lying opposite the ends of the auxiliary valve spindle, and adapted with the rise and fall of the float beyond predetermined limits to press upon the valve spindle and open or close the auxiliary valve, as set forth.

8. In combination, a vessel having water inlet and outlet pipes provided with non-return valves, and also having hollow protuberances at one end, one above another, a valve fitting comprising a tubular casing arranged vertically in the upper protuberance and having ports opening into said protuberance and said casing also having an enlarged cylindrical part, with steam inlet branch, lying below the protuberance, the upper and open end of the casing projecting above the protuberance, a tubular part fitting over said upper end and forming an exhaust outlet, an exhaust valve within said tubular part adapted to rest upon the said upper end of the valve casing, a steam inlet valve within the said enlarged cylindrical part of the casing, and a rod connecting said exhaust and inlet valves together, a loose fitting piston also within the enlarged cylindrical part of the casing connected to the steam valve and having a small hole, an auxiliary valve below the piston, the ends of the valve spindle extending outside the valve casing, and the valve being movable in a direction at right angles to the longitudinal axis of the said steam valve and piston, and means whereby with the rise and fall of the water in the vessel beyond predetermined limits the auxiliary valve is opened and closed, as set forth.

9. In combination, a vessel having water inlet and outlet pipes provided with non-return valves, a valve fitting comprising a main steam inlet valve, an exhaust outlet valve and a piston, the valves and piston being movable as one, and the exhaust valve opening when the inlet valve closes, said valve fitting also comprising a casing having an inlet branch for steam at a point between the main steam valve and piston, an auxiliary valve for controlling a passage between the piston and the atmosphere, said passage communicating with the steam inlet through a small aperture, and float-operated mechanism for controlling the said auxiliary valve, said main steam inlet valve being formed with a parallel-sided part and a conical part, and said parallel-sided part being adapted to slide in the valve casing and allow the exhaust valve to have a larger degree of opening than the inlet valve, as set forth.

In witness whereof we have hereunto set our hands in the presence of two witnesses.

JOHN JAMES ROYLE.
GEORGE ERIC ROYLE.

Witnesses:
ERNALD SIMPSON MOSELEY,
MARION E. CLAUD.